May 11, 1943.  L. D. ADAM  2,319,026
FISHING LURE
Filed Aug. 22, 1940
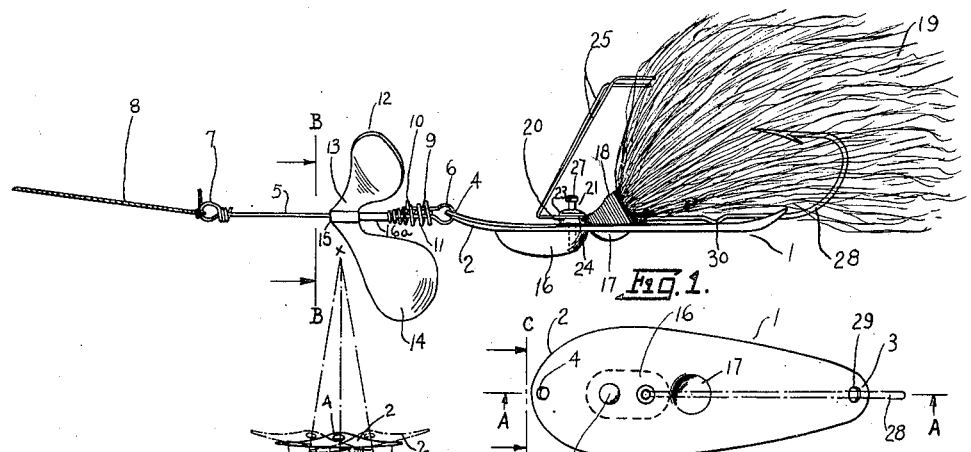
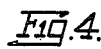
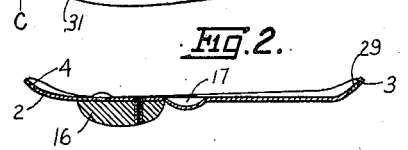
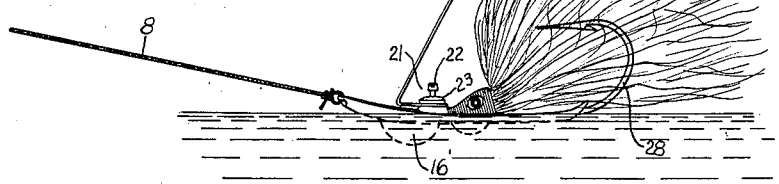
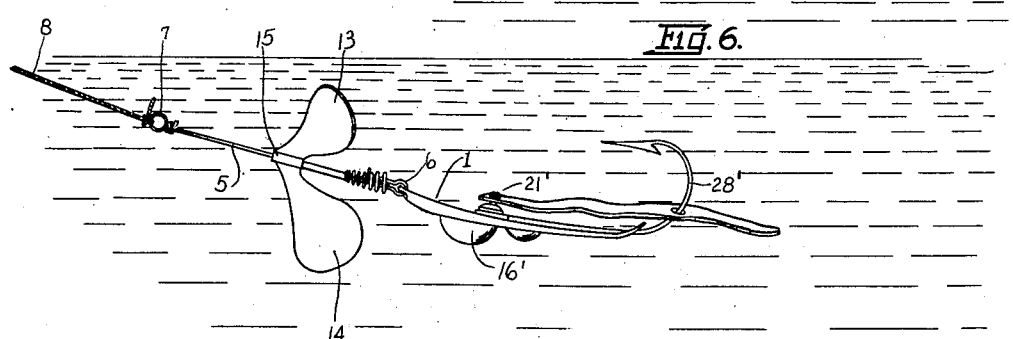
INVENTOR.
Louis D. Adam
BY Frank M. Slough
His ATTORNEY.

Patented May 11, 1943

2,319,026

UNITED STATES PATENT OFFICE 2,319,026

FISHING LURE

Louis D. Adam, Ponca City, Okla., assignor to The American Fork & Hoe Company, Cleveland, Ohio, a corporation of Ohio Application August 22, 1940, Serial No. 353,677

8 Claims. (Cl. 43—42)

My invention relates to artificial bait and relates more particularly to lures of the type adapted for both under-water and surface action.

An object of my invention is to provide an artificial bait of the type described which is adapted for action either as a surface lure or as an under-water lure.

Another object of my invention is to provide an artificial bait of the type described which is so formed as to be readily converted to either a surface or an under-water lure.

Another object of my invention is to provide an artificial bait of the type described which is able, when operating as a surface lure, to maintain an even keel.

Another object of my invention is to provide an artificial bait of the type described which, when operating as a surface lure, resists twisting of the line.

Another object of my invention is to provide an artificial bait of the type described which, when operating as a surface lure, operates in a highly efficient manner.

Another object of my invention is to provide an artificial bait of the type described which, when operated as an under-water lure, has a side-to-side rocking action but will not turn over or twist the line.

Another object of my invention is to provide an artificial bait of the type described which is constructed in a highly durable, efficient and economical manner.

Other objects of my invention and the invention itself will become increasingly apparent from the following description and the appended drawing in which:

Fig. 1 is a side elevational view of an artificial bait which is an embodiment of my invention, said lure having feathering attached whereby said lure is shown as a surface lure;

Fig. 2 is a top plan view of the lure body of Fig. 1 with the bucktail element omitted from the lure;

Fig. 3 is a sectional view taken from the line A—A of Fig. 2;

Fig. 4 is a view taken from the line B—B of Fig. 1;

Fig. 5 is a view taken from the line C—C of Fig. 2, dotted line in said figure being used to illustrate the positions which the lure will take while in use;

Fig. 6 is a side elevational view showing the lure in operation as a surface lure; and Fig. 7 is a side elevational view showing the bait in operation as an under-water lure.

Fig. 8 is an enlarged vertical transverse sectional view taken on the line 8—8 of Fig. 1.

Referring now to the drawing, in all of which like parts are designated by like reference characters, in Figs. 1 and 2, at 1, I show a lure body preferably formed of sheet metal, said body being generally of concavo-convex configuration, the said body being provided with a broad leading edge 2 generally tapering off to an upturned hook end 3, the leading edge 2 being provided centrally and forwardly thereof with a perforation 4 through which a shaft or spindle 5 is adapted to be projected, said shaft being provided with an eye 6 rearwardly thereof, which is projected through the perforation 4 to secure the shaft to the lure body, and an eye 7 forwardly thereof through which a line, indicated at 8, is adapted to be projected and to which the same is secured as shown.

It will be noted that the shaft or spindle 5 is preferably formed of stiff wire which is adapted to be bent back upon itself, as shown at 9, to form the eye 6 and further to form the upturned portion 10 which is adapted to be projected into a coil spring 11 to hold the eye in secure engagement with the lure body.

Fitted upon the spindle 5 is the unbalanced spinner 12 which is provided with a pair of blades 13 and 14, said blades being formed from a unitary piece of sheet metal which, as shown in Fig. 4, has the general contour of a Hogarth curve, the jointure of the two blades 13 and 14 being accomplished by a sleeve 15 which is adapted to be clamped about the spindle to permit the blades to rotate freely thereabout. Further, a sleeve 16a is telescoped over the spindle and adapted to move upon said spindle between the spinner and the spring and to maintain the spinner spaced apart from contact with the lure body 1.

Each of the spinner blades, as described, is curved reversely to the curve of the other blade and the provision of a pair of blades in the spinner member of unequal length imparts a desirable movement to the lure body.

The lure body proper is provided with a weight 16 disposed substantially centrally of the underside of the lure body and adjacent the forward edge of said lure body. Said weight may be formed substantially rectangular, as shown in Figs. 1 and 2, or may be generally cylindrical, as shown in Figs. 6 and 7 at 16'.

A depression 17 is preferably formed on the body of the lure adjacent the positioning of the said member 16 or 16' which is adapted to seat the winding head 18 of the feathering 19 when said feathering, which is secured to the hook 28, is added to the lure body. By means of the eye 20 provided on the hook 28 which is telescoped over the screw means 21, the feathering and hook are attached to the lure body to form a surface lure. The screw means 21, it will be noted is provided with a slotted head 22 and a flanged collar 23 and is adapted to be projected through a yoke 24 of feelers 25—25 as well as through the eye 20 of the hook 28.

A perforation 32 in the lure body 1 is aligned with a threaded perforation 33 provided in the weight 16 or 16' disposed thereunder whereby the feathering, the feelers, the hook 28, which is projected through the feathering and provided with the eye 20, and the weight 16 or 16' are secured to the lure body. Said hook 28, as above described, is adapted to be projected through the perforation 29 provided in the narrow upturned tail end of the lure and may further be provided, as shown, with a V-shaped portion 30 which securely locks that portion of the hook adjacent such end to the rear end of the lure body.

When the lure is provided with the feathering and the feelers, shown in Figs. 1 and 6, said lure is adapted to act as a surface lure and to maintain an even keel upon the surface of the water. The lure is restrained, by means of the weight, against twisting movement and the provision of the unbalanced spinner with cutting edges formed thereon enables the lure to travel on the surface of the water without tangling with any weed growth or turning over.

When the feathering and the feelers are detached from the lure, which may be done by detaching the screw 21 from the said lure body and removing the feathering and feelers therefrom and then replacing them with a hook 28' and the screw 21, the flanged collar of the screw presses down upon the eye 21' and the screw head 22 accommodating thereon a strip of pork rind or the like, if desired. The lure is thus adapted for action as an under-water lure and its action is then quite different from its action as described as a surface lure; the lure body now has a side rocking action, as shown in Fig. 5, but even when operating as an under-water lure, the lure will not turn over due to the provision of the weight and its disposition adjacent the wide leading edge provided thereon and it is to be noted that the remainder of the lure body tapers down to a comparatively narrow tail portion.

As best shown in Fig. 2, the weight in both forms is preferably also secured to the lure body adjacent its forward end by means of a rivet 31 or the like.

I am aware that numerous and extensive departures may be made from the embodiments of my invention herein illustrated and described without however departing from the spirit of my invention and the appended claims.

I claim:

1. A fish lure comprising a hook, a generally elliptical shaped body, said body having a relatively wide upturned leading edge to which line attachment means are adapted to be secured and a relatively narrow upturned tail through which said hook projects, said hook being secured to the body adjacent to and rearwardly of said leading edge, a weight disposed adjacent the leading edge of the body and spaced therefrom, said weight being positioned forwardly of the center of the lure body and generally midway transversely thereof.

2. A fish lure comprising a hook, a generally elliptical shaped body, said body being of generally concavo-convex form and having a relatively wide upturned leading edge to which line attachment means are adapted to be secured, a relatively narrow upturned tail portion through which said hook projects, said hook being secured to the body adjacent to and rearwardly of said leading edge, and a weight disposed beneath the body adjacent the leading edge and spaced therefrom and generally midway transversely thereof.

3. A fish lure comprising a hook, a generally elliptical shaped lure body, said body having a relatively wide upturned leading edge to which line attachment means are adapted to be secured and a relatively narrow upturned tail to which hook means generally are adapted to be secured, a weight disposed beneath the lure body and secured thereto adjacent the leading edge of the lure body and spaced therefrom, said weight being positioned forwardly of the center of the lure body and generally centrally thereof, an unbalanced spinner rotatably mounted on said line attachment means which cooperates with the relatively wide upturned leading edge of the lure body to communicate motion imparted thereto to the remainder of the lure body.

4. A fish lure comprising a hook, a generally elliptical shaped lure body, said body being of generally concavo-convex form and having a relatively wide upturned leading edge to which line attachment means are adapted to be secured, a relatively narrow upturned tail portion to which hook means generally are adapted to be secured, a weight disposed beneath the lure body secured thereto adjacent the leading edge and spaced therefrom being disposed and generally centrally thereof, and securing means securing the hook and the weight to the lure body.

5. A fish lure comprising a hook, a generally elliptical shaped lure body, said body being of generally concavo-convex form and having a relatively wide leading edge to which line attachment means are adapted to be secured, a relatively narrow upturned tail portion to which hook means generally are adapted to be secured, a weight disposed beneath the lure body adjacent the leading edge and spaced therefrom and generally centrally of the lure body, said weight being disposed, said hook being provided with feathering and said lure being provided with feelers, and securing means securing said hook, feelers and weight to said lure body.

6. A fish lure comprising a hook, a generally elliptical shaped lure body, said body being of generally concavo-convex form and having a relatively wide leading edge to which line attachment means are adapted to be secured, a relatively narrow upturned tail portion to which hook means generally are adapted to be secured, a weight disposed beneath the lure body adjacent the leading edge and spaced therefrom and generally centrally of the lure body, said weight being disposed, said hook being provided with feathering and said lure being provided with feelers, said lure adapted to have side to side rocking motion but maintaining an even keel.

7. A fish lure comprising a hook, a generally elliptical shaped lure body, said body having a relatively wide upturned leading edge to which line attachment means are adapted to be secured and a relatively narrow upturned tail through which hook means are projected, said hook means being secured to the lure adjacent to and rearwardly of said leading edge, a generally elliptical shaped weight disposed longitudinally of the lure body and secured thereto, said weight being disposed adjacent the leading edge of the lure body and forwardly of the center of the lure body.

8. A fish lure comprising a hook, a generally elliptical shaped lure body, said body being of generally concavo-convex form and having a relatively wide leading edge to which line attachment means are adapted to be secured, a relatively narrow upturned tail portion through which hook means are projected, said hook means being secured to the lure adjacent to and rearwardly of said leading edge, a weight disposed beneath the lure body adjacent the leading edge and generally medially thereof forwardly of the center of the lure body, said hook, lure body and weight adapted to be secured together by unitary mounting means.

LOUIS D. ADAM.